May 21, 1968     R. J. FARRELL ET AL     3,384,429

NEEDLE ROLLER BEARING ASSEMBLY

Filed Sept. 23, 1965     2 Sheets-Sheet 1

FIG. 3.ᵃ

INVENTORS:
RONALD J. FARRELL
FRED LANNERT

BY *Howson & Howson*

ATTYS.

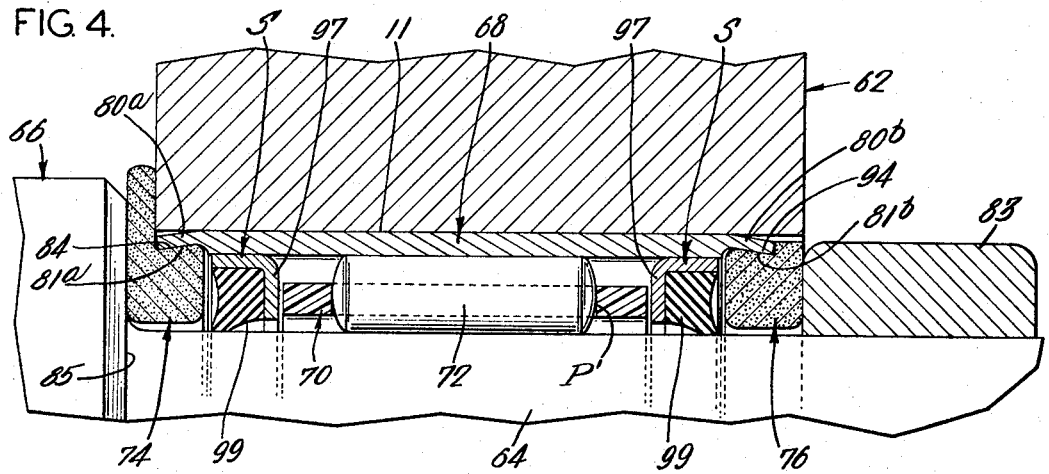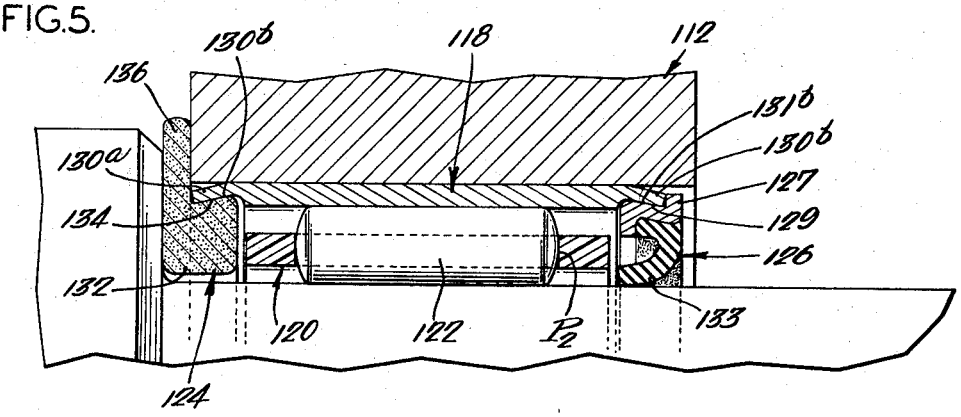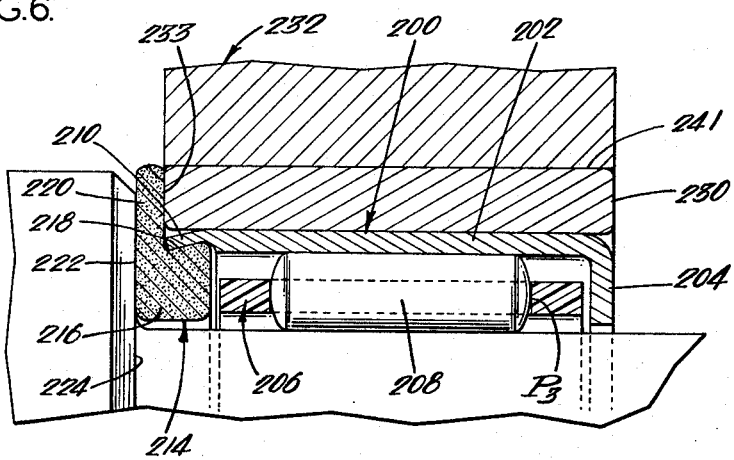

United States Patent Office 3,384,429
Patented May 21, 1968

3,384,429
NEEDLE ROLLER BEARING ASSEMBLY
Ronald J. Farrell, Bremen, and Fred Lannert, South Bend, Ind., assignors to SKF Industries, Inc., Prussia, Pa., a corporation of Delaware
Filed Sept. 23, 1965, Ser. No. 489,494
5 Claims. (Cl. 308—187.1)

ABSTRACT OF THE DISCLOSURE

A roller bearing assembly comprising a generally cylindrical hollow shell, a retainer for a plurality of rolling elements disposed interiorly of the shell and at least one thrust ring adapted to be detachably secured to one end of the cylindrical shell. The shell is provided with at least one circumferentially extending rim of relatively thin cross section having a frusto-conical inner face which is outwardly convergent and the thrust ring is provided with a frusto-conical outer surface complementing the inner face of the rim. The face of the rim and surface of the ring are inclined at an angle of no greater than 7° whereby the ring may be snapped into place at one axial end of the shell.

---

This invention relates to improvements in rolling bearing assemblies and more particularly to an improved needle bearing assembly which is designed to withstand both radial and thrust or axial loads.

The needle roller bearing of the present invention is characterized by novel features of construction and arrangement which makes it extremely economical to make, easy to assemble and extremely effective for the purposes intended. The needle roller bearing of the present invention comprises an outer casing in the form of a generally cylindrical hollow sleeve or shell, a retainer mounted in the housing having a plurality of pockets for roller elements and at least one thrust ring made of a suitable bearing material, for example, oil-impregnated sintered bronze detachaby secured at one axial end of the casing. More specifically at least one axial end of the casing is provided with a preformed circumferentially extending lip or rim which is outwardly convergent to define a frusto conical inner face and the thrust ring is provided with a circumferentially extending frusto conical surface which complements and snugly engages the inner frusto conical face of the rim of the casing in the assembled relation. By this arrangement the thrust ring may be "snapped on" to the axial end of the casing. Moreover in the assembled relation, the mating union between the tapered face and surface of the rim of the casing and ring is strengthened and tightened more securely when the roller bearing assembly is pressed into the bore of a housing. Further by this arrangement the bearing assembly may be easily removed from the housing when desired and the thrust ring may be dis-assembled for inspection, cleaning and relubrication of the bearing. It is noted that the various components of the needle roller bearing assambly are not destroyed by this operation and may be re-assembled without damage if found to be dimensionally acceptable. However, if any of the components including the thrust ring is found to be worn, this component or any of the other components may be replaced and the entire assembly may be put back together and assembled in the housing in a very simple operation.

Another feature of the needle roller bearing assembly of the present invention is that the radial load carrying portion of the bearing, i.e. the rollers, and the thrust load carrying portion, i.e. the thrust ring are separate and each may be lubricated in the manner best suited. This is an advantage where the needle rollers are "greased for life" and the thrust ring would be better served by a forced oil system or oil mist. The bearing lubricant therefore would not have to be a compromise and each bearing area could be lubricated as best suits the particular type of action for that portion of the bearing.

A further feature of the present invention is that the cylindrical casing is so designed that sealing elements may be carried internally of the bearing and these may be assembled prior to assembly of the thrust rings in a very easy manner.

With the foregoing in mind, an object of the present invention is to provide an improved "combined radial and axial thrust" needle roller bearing assembly which is of simple construction and which may be manufactured and assembled easily and economically.

Still another object of the present invention is to provide an improved needle roller bearing assembly including a pair of "snap-on" thrust rings at opposite ends of the assembly whereby the assembly may be easily dis-assembled and inspected and wherein the components of the bearing assembly may be put together very easily.

These and other objects of the present invention and the various features and details of a needle roller bearing assembly constructed in accordance with the present invention are hereinafter more fully set forth with reference to the accompanying drawings, wherein;

FIG. 3a is an enlarged sectional view taken on lines 3a—3a of FIG. 3;

FIG. 4 is a fragmentary sectional view of a second embodiment of needle roller bearing assembly in accordance with the present invention;

FIG. 5 is a fragmentary sectional view similar to FIG. 4 showing a third embodiment of needle roller bearing assembly in accordance with the present invention; and FIG. 6 is a fragmentary sectional view of a fourth embodiment of needle roller bearing assembly in accordance with the present invention.

Figure 1:
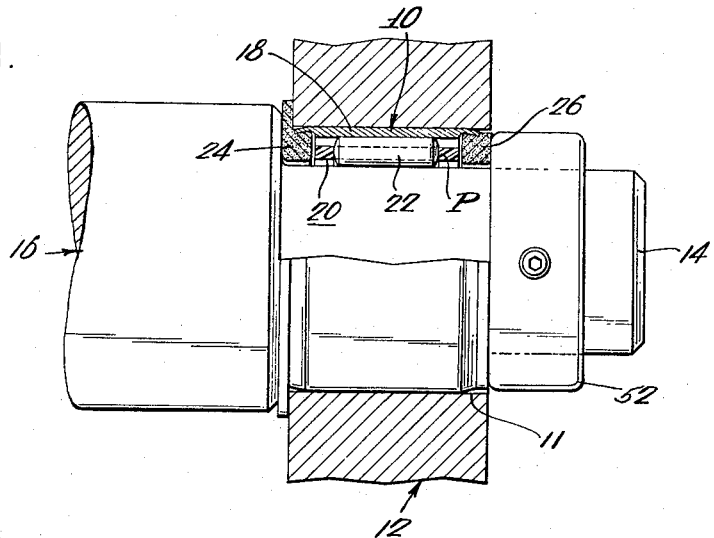
FIG. 1 is a side elevational view partly in section showing a needle roller bearing assembly constructed in accordance with the present invention.
Figure 2:
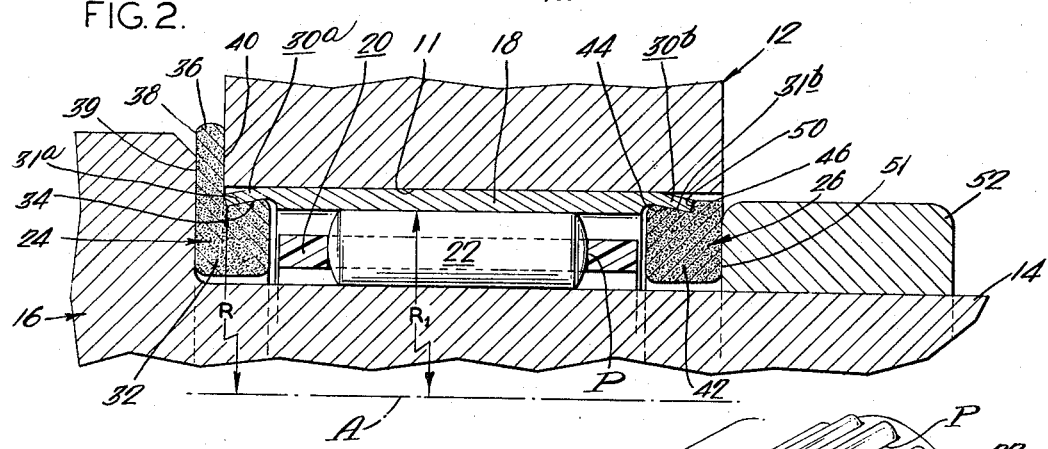
FIG. 2 is an enlarged fragmentary sectional view showing the components of the needle roller bearing assembly in accordance with the present invention.
Figure 3:
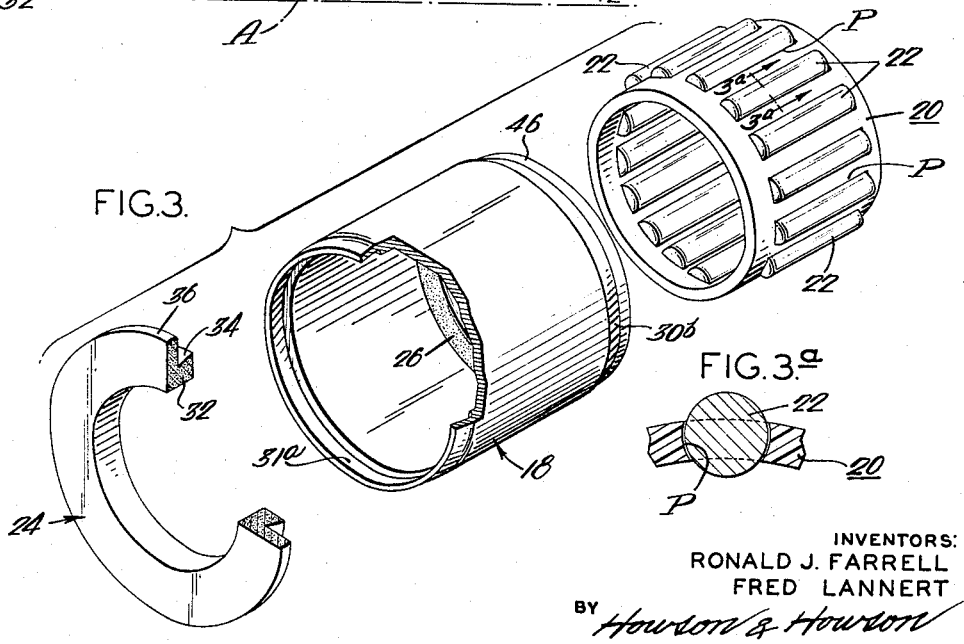
FIG. 3 is an exploded view of the components of the needle roller bearing assembly.

Referring now to the drawings and particularly to FIG. 1 thereof, there is shown a needle roller bearing assembly in accordance with the present invention generally designated by the numeral 10. In the present instance the needle roller bearing assembly supports a pair of members for relative rotation and is mounted in the bore 11 of a housing 12 and circumscribes the reduced portion 14 of a shaft 16 rotatably mounted in the housing 12.

The needle roller bearing assembly 10 comprises a casing in the form of a hollow cylindrical casing or shell 18, a retainer 20 which has a plurality of circumferentially spaced pockets P to support therein the needle rollers 22, the retainer 20 and rollers 22 being disposed interiorly of the casing 18.

The retainer 20 and rollers are supported in the casing 18 by means of a pair of thrust rings 24 and 26 detachably secured to the outer axial ends of the casing. In the present instance the thrust rings and casing are so designed that the thrust rings may be snapped into place in the axial ends of the casing to permit easy assembly of the components of the needle roller bearing and also to facilitate inspection of the bearing and replacement of parts when necessary. To this end, the shell 18 is provided at opposite axial ends with circumferentially extending inclined rims 30a and 30b which as illustrated are of reduced cross section. The rims are outwardly convergent to define inner frusto conical faces 31a and 31b. The faces 31a and 31b are inclined to the axis of rotation A of the shell at an angle of approximately 7°, and the radius R of the opening defined by the terminal edge of each rim is preferably greater than the internal radius $R_1$ of the shell 18 to permit components of the assembly to be assembled interiorly of the shell 18 from either axial end.

Each of the thrust rings includes a circumferentially extending frusto conical surface which complements the frusto conical face of the rims so that the rings may be snapped in place at opposite axial ends of the shell 18. The thrust rings are made of a suitable bearing material for example oil impregnated sintered bronze. For example the thrust rings 24 consists of an annular portion 32 having an outer inclined periphery defining a frusto conical surface 34 and a circumferentially extending radially projecting flange 36 which provides a comparatively large thrust face 38 adapted to bear against a shoulder 39 on the shaft. The thickness of the flange 36 may vary to provide a means for locating the roller bearing assembly in a selected position on the shaft. The opposite face 40 of the flange 36 provides an abutment against which the rim 30a of the casing engages in the assembled relation. The thrust ring 26, in the present instance, also comprises an annular portion 42 having an outer inclined periphery defining a frusto conical surface 44 which complements the frusto conical face of the rim and a short radial projection 46 providing a small shoulder 50 against which the rim abuts. The outer axial end face 51 of the ring 26 provides a thrust face adapted to bear against a thrust collar 52 on the shaft 16.

In assembling a needle roller bearing in accordance with the present invention, the rollers 22 are snapped into the pockets P in the retainer 20, the retainer being made of a flexible material such as Nylafil so that it deforms slightly to permit the rollers to be inserted in this manner. Thereafter the retainer and rollers are positioned interiorly of the shell 18. It is noted that since the radius R of the opening defined by the inner edge of the rims 30a and 30b is greater than the internal radius $R_1$ of the shell 18, the retainer may be simply slipped into the shell from either axial end. The thrust rings 24 and 26 are then snapped into the open outer axial ends of the shell 18. It is noted that the slight flexibility of the rims and the angle of taper of the frusto conical face and surface of the rim and rings permits the "snap on" action and insures a fairly tight union between the parts. Further the assembly operation is greatly simplified by reason of the fact that the parts are preformed. Now when it is desired to use the rolling bearing assembly in an arrangement such as that shown in FIG. 1, the shell 18 is pressed into the bore 11 of the housing 12, the bore 11 being of a size to provide a press fit between the shell 18 and the housing. It is noted that in the assembled relation, the housing 18 is compressed slightly thereby to more firmly secure the thrust rings in the axial ends of the shell of the needle roller bearing assembly. The shaft 14 is then positioned interiorly of the bearing until the thrust face of the ring 24 abuts the shoulder on the shaft. The thrust collar 52 is then positioned over the reduced end portion of the shaft and secured thereto by means of a set screw. In this arrangement the bearing assembly withstands axial thrust in either direction and also radial load. Now when it is desired or necessary to inspect the bearing, the thrust collar 52 is simply removed and the shaft withdrawn from interiorly of the bearing assembly. The shell 18 is then removed from the housing 12 and thereafter the thrust rings may be easily dis-assembled from the shell 18 so that the retainer and rollers may be removed for inspection. If the thrust rings are worn or any components need replacement they may be readily replaced and then re-assembled in the manner noted above.

There is shown in FIG. 4 a second embodiment of the needle roller bearing in accordance with the present invention. This needle roller bearing assembly is designed to withstand radial load and axial thrust load in either direction and is adapted to be mounted in a stationary member such as a housing 62 to support a shaft 66 having a reduced portion 64 rotatably journaled in the housing. The bearing assembly is similar to that described previously in general configuration comprising an outer casing in the form of a hollow tubular cylindrical shell 68, a retainer 70 having a plurality of pockets $P_1$ for rollers 72 mounted interiorly of the shell, and a pair of thrust rings 74 and 76 at opposite open axial ends of the shell 68.

The thrust rings are adapted to be "snapped on" to the axial ends of the shell to facilitate assembly and disassembly of the bearing. To this end the opposite ends of the shell 68 are provided with preformed rims 80a and 80b of reduced cross section, the rims 80a and 80b having inner frusto conical faces 81a and 81b which are outwardly convergent. The ring 74 is provided with a frusto conical surface 84 which complements the inclined face 81a of the rim 80a so that it may be snapped in place under the rim 80a. The thrust ring 76 is also provided with a circumferentially extending frusto conical inclined surface 94 which is inclined in a direction so that it may be snapped into place under the rim 80a at the end of the shell 68.

In the present instance the needle roller bearing assembly includes a pair of seals at each side of the retainer which protect the rollers aginst infiltration of dirt and foreign matter and also retain lubricant in the interior of the bearing assembly. In the present instance each seal assembly S comprises an annular retaining member 97 and a circumferentially extending sealing element 99 made of a suitable sealing material such as rubber. In assembling the components of this embodiment of the invention, the rollers 72 are snapped into the pockets $P_1$ of the retainer and then the retainer and the rollers are positioned interiorly of the shell 68. The seals S are then pressed into the shell from opposite axial ends, the outer diameter of the seal retaining member 97 being so dimensioned relative to the inner diameter of the shell 68 to provide a press fit. The thrust rings 74 and 76 are then snapped into the opposite axial ends of the shell 68 and then the entire assembly is pressed into the housing 62. It is noted that when the shell 68 is pressed into the housing, the shell is compressed slightly whereby the union between the seals and shell and between thrust rings and the shell is tightened more securely. Thereafter a thrust collar 83 is positioned over the shaft so that the bearing assembly is disposed between the collar 83 and a shoulder 85 on the shaft. Thus, this assembly as noted previously is able to withstand axial thrust loads in either direction and also radial loads.

There is shown in FIG. 5 a third embodiment of needle roller bearing assembly in accordance with the present invention. This embodiment is designed to take radial and axial thrust loads in only one direction. To this end the needle rolling bearing assembly comprises a casing in the form of an outer hollow cylindrical shell 118, a retainer 120 having a plurality of circumferentially spaced pockets $P_2$ therein for a plurlity of roller elements 122 housed interiorly of the shell 118.

In the present instance the needle roller bearing assembly includes a thrust ring 124 detachably secured at one axial end of the shell 118 and a seal 126 detachably secured at the opposite axial end of the shell 118. The thrust ring 124 is similar to the thrust ring 24 shown in the first embodiment and includes an annular portion 132 and a radially outwardly projecting circumferentially extending thrust flange 136. The outer peripheral face of the annular portion is provided with a frusto conical surface 134 which is inclined in the same direction as the inner frusto conical face 130b of the rim 130a at one end of the shell 118. By this arrangement the thrust ring may be snapped into place as shown in FIG. 5. The seal 126 at the opposite axial end of the shell 118 includes a Z-shaped retaining member 127 having a frusto conical inclined face 129 complementing the outwardly convergent frusto conical face 131b of the rim 130b so that the seal may be snapped in place in the same manner as the thrust ring. The Z-shaped retaining member 127 of the seal mounts a flexible resilient sealing element 133 which may be secured to the retainer by means of a suitable adhesive and which in the assembled relation seals the interior of the bearing against infiltration of dust and foreign matter.

This needle roller bearing is adapted to be mounted in a stationary housing 112 similar to that described above and when the shell 118 is pressed into a bore in the housing, the clamping or contacting relation between the thrust ring and the shell is increased.

The fourth embodiment of the needle roller bearing assembly in accordance with the present invention is illustrated in FIG. 6. This assembly generally designated by the numeral 200, comprises a casing in the form of a generally cylindrical hollow shell 202 having in the present instance a radially inwardly projecting wall 204 at one axial end, and a retainer 206 having a plurality of pockets $P_3$ for rollers 208 housed in the shell. The shell 202 has a circumferentially extending rim 210 at the axial end thereof opposite the flange 204 which as illustrated is of reduced cross section and is outwardly convergent to define a frusto conical inner face 212. A thrust ring 214 is adapted to be attachably secured to the axial end of the shell 202 remote from the flange 204. This thrust ring 214 is adapted to be snapped in place and to this end comprises an annular portion 216 having an outer tapered circumferentially extending frusto conical surface 218 which tapers in the same direction and complements the frusto conical face 218 of the rim 210. By this arrangement the thrust ring 216 may be snapped into the axial end of the shell 202 after the retainer and rollers are inserted therein. The thrust ring 216 further includes a radially outwardly projecting circumferentially extending flange 220 providing a thrust face 222 adapted to engage the shoulder 224 on the shaft journaled in the housing 232. This circumferential flange also defines an abutment face 233 against which the edge of the rim engages when the thrust ring is snapped into the shell 202.

In the present instance the needle roller bearing assembly is adapted to be pressed into an unhardened sleeve 230 which in turn is press fitted in a bore 241 of stationary member 232 such as a housing. By this arrangement there is provided both a support for the radial section of the bearing and the machined ends of the sleeve provide a backup support for the thrust flange.

While particular embodiments of the invention have been illustrated and described herein, it is not intended to limit the invention and changes and modifications may be made therein within the scope of the following claims.

We claim:

1. A needle roller bearing assembly comprising a generally cylindrical hollow shell, a retainer disposed interiorly of said shell having a plurality of circumferentially spaced pockets, a plurality of rolling elements mounted in said pockets, at least one circumferentially extending rim of relatively thin cross section at one end of said cylindrical shell having a frusto-conical inner face which is outwardly convergent, at least one thrust ring made of a sintered bronze material detachably secured to said one end of said cylindrical shell, said thrust ring having a circumferentially extending outer surface which is frusto-conical and complements said frusto-conical face of said rim, said frusto-conical face of said rim and said frusto-conical surface of said thrust ring being inclined at an angle of no greater than 7° to the rotational axis of said shell whereby said ring may be snapped into the said one axial end of said shell without permanently deforming said rim, said thrust ring having a circumferentially extending radially outwardly directed flange which projects radially beyond the periphery of said shell providing a means for locating the bearing assembly on a shaft or the like and serving as a thrust member.

2. A needle roller bearing assembly comprising a generally cylindrical hollow shell, a retainer disposed interiorly of said shell having a plurality of circumferentially spaced pockets mounted in said shell, a plurality of rolling elements mounted in said pockets, a circumferentially extending rim of relatively thin cross section at each end of said cylindrical shell, each rim having a frusto-conical inner face which is outwardly convergent, a thrust ring made of a sintered bronze material detachably secured to one end of said cylindrical shell, said thrust ring having a circumferentially extending outer surface which is frusto-conical and complements said frusto-conical face of said rim, said frusto-conical face of said rim and said frusto-conical surface of said thrust ring being inclined at an angle of no greater than 7° to the rotational axis of said shell whereby said ring may be snapped into the said one axial end of said shell without permanently deforming said rim, a seal at the opposite axial end of said shell, said seal including a seal retainer member having a frusto-conical periphery which complements said frusto-conical face of said rim so that it may be snapped into engagement with said rim.

3. A needle roller bearing assembly comprising a generally cylindrical hollow shell, a retainer disposed interiorly of said shell having a plurality of circumferentially spaced pockets mounted in said shell, a plurality of rolling elements mounted in said pockets, a circumferentially extending rim of relatively thin cross section at one end of said cylindrical shell having a frusto-conical inner face which is outwardly convergent, a radially inwardly projecting lip at the opposite axial end of said shell, at least one thrust ring made of a sintered bronze material detachably secured to said one end of said cylindrical shell, said thrust ring having a circumferentially extending outer surface which is frusto-conical and complements said frusto-conical face of said rim, said frusto-conical face of said rim and said frusto-conical surface of said thrust ring being inclined at an angle of no greater than 7° to the rotational axis of said shell whereby said rim may be snapped into the said one axial end of said shell without permanently deforming said rim.

4. A needle roller bearing assembly as claimed in claim 1 wherein the radius of the opening defined by the outer terminal edge of said rim is greater than the internal radius of the shell so that components of the assembly may be inserted in the shell from either axial end.

5. A needle roller bearing assembly as claimed in claim 1 including at least one sealing element disposed interiorly of said shell between said retainer and said thrust ring.

References Cited

UNITED STATES PATENTS

| 1,355,706 | 10/1920 | Snyder | 308—23 |
| 2,676,074 | 4/1954 | Nausbaum | 308—212 |
| 2,747,949 | 5/1956 | Smith | 308—187.2 |
| 3,004,808 | 10/1961 | Powers | 308—212 |
| 3,007,752 | 11/1961 | Gales | 308—187.2 |
| 3,306,682 | 2/1967 | Cowles | 308—187.2 |
| 3,216,753 | 11/1965 | Oishei | 287—87 |

FOREIGN PATENTS

| 577,632 | 9/1924 | France. |
| 764,818 | 5/1951 | Germany. |
| 820,237 | 9/1959 | Great Britain. |
| 966,285 | 8/1957 | Germany. |
| 1,066,814 | 10/1959 | Germany. |
| 927,779 | 5/1955 | Germany. |

MARTIN P. SCHWADRON, *Primary Examiner.*

L. L. JOHNSON, *Assistant Examiner.*